United States Patent
Wang et al.

(10) Patent No.: US 11,829,180 B2
(45) Date of Patent: *Nov. 28, 2023

(54) PRESSURE DETECTION DEVICE

(71) Applicant: PixArt Imaging Inc., Hsin-Chu (TW)

(72) Inventors: Wei-Chung Wang, Hsin-Chu (TW);
Hsin-Chia Chen, Sunnyvale, CA (US);
Hui-Hsuan Chen, Hsin-Chu (TW);
Chao-Chien Huang, Hsin-Chu (TW);
Chu-Hung Nien, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,022

(22) Filed: Aug. 24, 2021

(65) Prior Publication Data

US 2021/0382514 A1 Dec. 9, 2021

Related U.S. Application Data

(60) Continuation of application No. 16/708,317, filed on Dec. 9, 2019, now Pat. No. 11,144,084, which is a continuation of application No. 16/445,165, filed on Jun. 18, 2019, now Pat. No. 10,545,528, which is a division of application No. 15/681,415, filed on Aug. 20, 2017, now Pat. No. 10,372,155.

(51) Int. Cl.
*G05G 9/047* (2006.01)
*G06F 3/038* (2013.01)

(52) U.S. Cl.
CPC ............. *G05G 9/047* (2013.01); *G06F 3/038* (2013.01); *G05G 2009/04759* (2013.01)

(58) Field of Classification Search
CPC ........ G06F 3/033; G06F 3/038; G06F 3/0338; G06F 1/169; G05G 2009/04759; G05G 9/047; A63F 13/24; A63F 13/28; A65F 13/214

See application file for complete search history.

(56) References Cited

U.S. PATENT DOCUMENTS

| | | | |
|---|---|---|---|
| 3,644,972 | A | 2/1972 | Evans |
| 6,300,940 | B1 | 10/2001 | Ebina |
| 2001/0007449 | A1 | 7/2001 | Kobachi |

(Continued)

FOREIGN PATENT DOCUMENTS

| | | |
|---|---|---|
| CN | 101135944 A | 3/2008 |
| CN | 101377915 A | 3/2009 |

(Continued)

*Primary Examiner* — Benjamin C Lee
*Assistant Examiner* — Nathan P Brittingham
(74) *Attorney, Agent, or Firm* — Winston Hsu

(57) ABSTRACT

A pressure detection device of detecting a forced state of a deformable object includes a body, an image sensor and a processor. The body is a deformable hollow structure. The body has an inner surface and an outer surface, and an identifiable vision feature is disposed on the inner surface. The image sensor is disposed inside the body and faces the inner surface of the body, and is adapted to capture a frame containing the identifiable vision feature on the inner surface. The processor is electrically connected with the image sensor, and adapted to analyze position variation of the identifiable vision feature within the captured frame for identifying a motion type of a gesture applied to the outer surface of the body.

7 Claims, 10 Drawing Sheets

(56) References Cited

U.S. PATENT DOCUMENTS

| | | |
|---|---|---|
| 2001/0055001 A1 | 12/2001 | Sakamaki |
| 2003/0128194 A1* | 7/2003 | Pettersson .............. G06V 10/17 |
| | | 345/173 |
| 2005/0062721 A1* | 3/2005 | Hsu ....................... G06F 3/0338 |
| | | 345/166 |
| 2005/0275623 A1 | 12/2005 | Chadha |
| 2007/0236692 A1 | 10/2007 | Schebesta |
| 2008/0001918 A1 | 1/2008 | Hsu |
| 2008/0016711 A1 | 1/2008 | Baebler |
| 2009/0201031 A1 | 8/2009 | Morimoto |
| 2009/0211820 A1 | 8/2009 | Lin |
| 2010/0286498 A1 | 11/2010 | Dacquay |
| 2011/0168874 A1 | 7/2011 | Phan Le |
| 2012/0001860 A1 | 1/2012 | Phan Le |
| 2013/0076629 A1 | 3/2013 | Lin |
| 2015/0319821 A1 | 11/2015 | Yoshida |
| 2016/0361635 A1 | 12/2016 | Schmitz |
| 2017/0153456 A1* | 6/2017 | Huang ............... G02B 27/0176 |
| 2018/0059850 A1 | 3/2018 | Kerr |
| 2022/0276405 A1 | 9/2022 | Watanabe |

FOREIGN PATENT DOCUMENTS

| | | | |
|---|---|---|---|
| CN | 101515322 A | 8/2009 | |
| CN | 102279655 A | 12/2011 | |
| CN | 104731310 A | 6/2015 | |
| CN | 105051660 A | 11/2015 | |
| CN | 105233497 A | 1/2016 | |
| CN | 106182154 A | 12/2016 | |
| CN | 109460159 A | 3/2019 | |
| JP | 2000-148391 A | 5/2000 | |
| KR | 10-2006-0092422 A | 8/2006 | |
| TW | 200807287 A | 2/2008 | |
| TW | 200937262 | 9/2009 | |
| WO | WO-2005029028 A1 * | 3/2005 | ............ B25J 13/084 |
| WO | 2021/100261 A1 | 5/2021 | |

* cited by examiner

US 11,829,180 B2

PRESSURE DETECTION DEVICE

CROSS REFERENCE TO RELATED APPLICATIONS

This application is a continuation application of U.S. patent application Ser. No. 16/708,317 filed on Dec. 9, 2019, which is a continuation application of U.S. patent application Ser. No. 16/445,165 filed on Jun. 18, 2019, which is a divisional application of U.S. patent application Ser. No. 15/681,415 filed on 2017 Aug. 20. The above mentioned applications are included in their entirety herein by reference.

BACKGROUND OF THE INVENTION

1. Field of the Invention

The present invention relates to a pressure detection device, and more particularly, to a pressure detection device of detecting a forced state of a deformable object.

2. Description of the Prior Art

A conventional mechanical joystick includes a sensor, a trackball, a lever arm and a handle. A user presses the handle to move the lever arm, the lever arm can be inclined and rotated via the trackball, and the sensor detects motion of the trackball to control a cursor signal output by the mechanical joystick. The handle is made by solid material and can be pushed and pulled to recline the lever arm for generating the cursor signal. While the mechanical joystick is reclined, the lever arm can be rotated or slanted towards specially designated directions, and the trackball recovers the lever arm via a spring. Therefore, the conventional mechanical joystick is operated by limited gestures due to the designated directions, and may easily result in mechanical fatigue by long-term usage.

SUMMARY OF THE INVENTION

The present invention provides pressure detection device of detecting a forced state of a deformable object for solving above drawbacks.

According to the claimed invention, a pressure detection device of detecting a forced state of a deformable object includes a body, an image sensor and a processor. The body is a deformable hollow structure. The body has an inner surface and an outer surface, and an identifiable vision feature is disposed on the inner surface. The image sensor is disposed inside the body and faces the inner surface of the body, and is adapted to capture a frame containing the identifiable vision feature on the inner surface. The processor is electrically connected with the image sensor, and adapted to analyze position variation of the identifiable vision feature within the captured frame for identifying a motion type of a gesture applied to the outer surface of the body.

The present invention disposes the pattern on the deformable bottom surface of the body, the pattern can be an asymmetric graffito, the plurality of colored dots or conducting dots, characteristics of the pattern can be varied in accordance with motion of the joystick, so that the characteristic variation can be transformed into the gesture applied to the joystick. The joystick and the related control method in the present invention have no drawback of the mechanical fatigue, and the joystick can read various gestures for preferred user experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
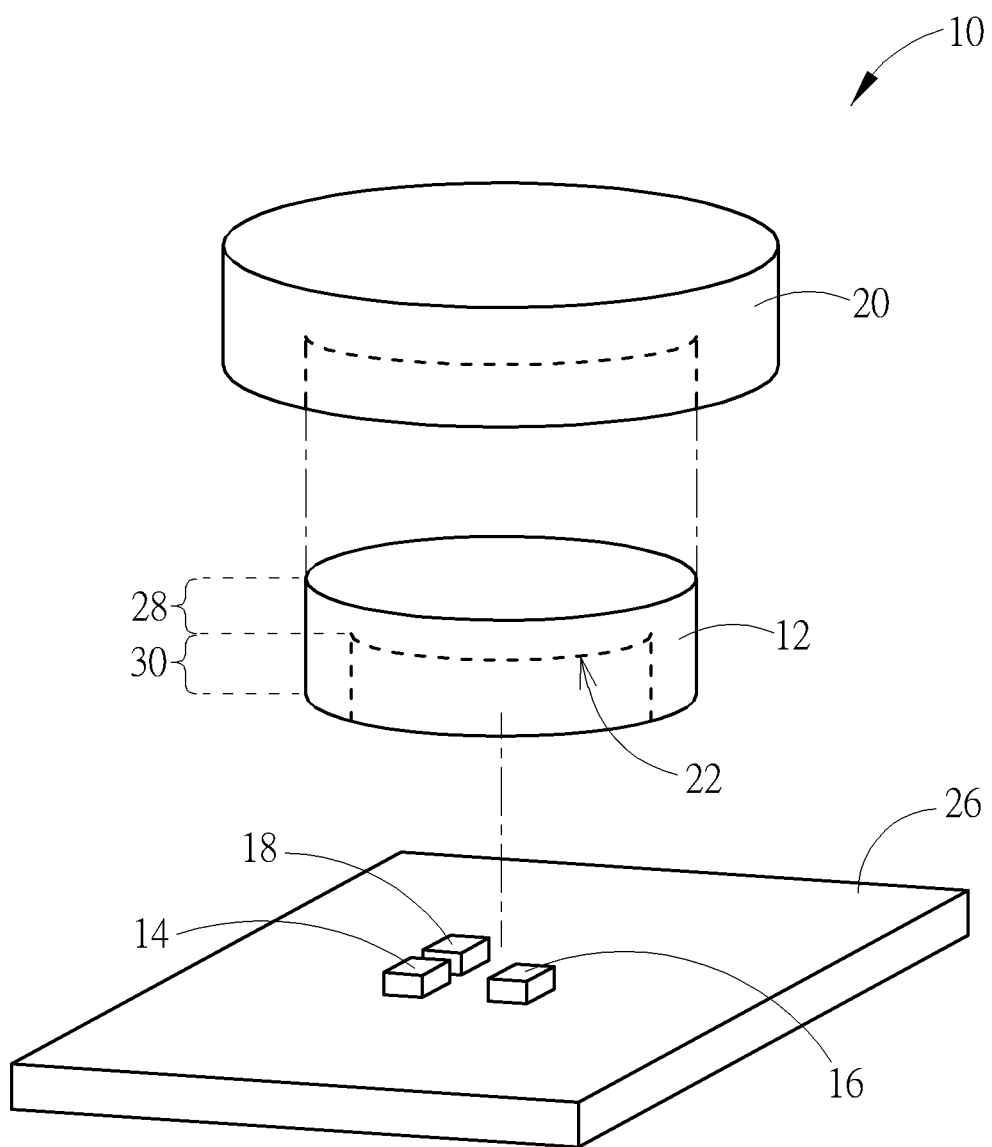
FIG. 1 is a diagram of a joystick according to a first embodiment of the present invention.
Figure 2:
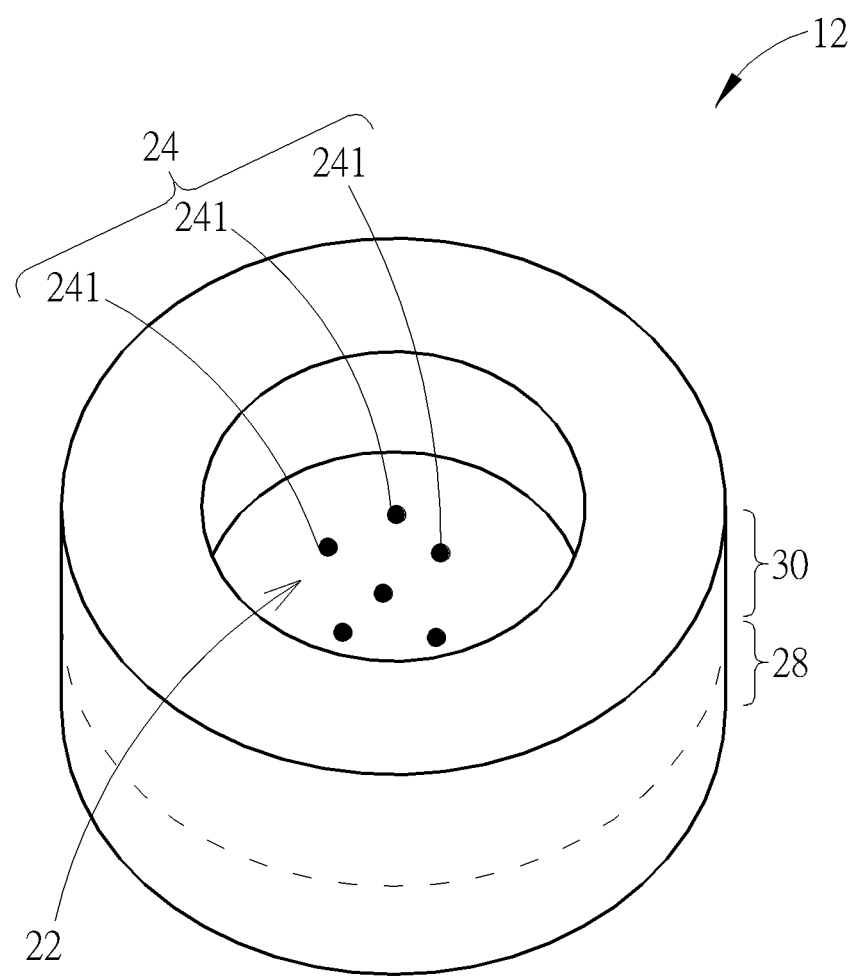
FIG. 2 is a diagram of a body of the joystick in a bottom view according to the first embodiment of the present invention.

Please refer to FIG. 1 and FIG. 2. FIG. 1 is a diagram of a joystick 10 according to a first embodiment of the present invention. FIG. 2 is a diagram of a body 12 of the joystick 10 in a bottom view according to the first embodiment of the present invention. The joystick 10 can be a pressure detection device which includes the body 12, an image sensor 14, a processor 16, a light source 18 and an opaque cover 20. The body 12 has a deformable bottom surface 22 whereon a pattern 24 is disposed. The image sensor 14 and the light source 18 are disposed on a circuit board 26 and located under the body 12. The light source 18 is an optional element adapted to project a beam onto the deformable bottom surface 22, and the image sensor 14 can capture at least one frame about the pattern 24. The opaque cover 20 is disposed above the body 12 for shelter and protection, and can be pressed and/or pushed by a user for operation of the joystick 10. The processor 16 is electrically connected with the image sensor 14 and the light source 18, and can generate a displayed object control signal while the joystick 10 is handled according to pattern variation within the frame, and the displayed object can be represented as a cursor displayed on a screen panel electrically connected with the joystick 10. Besides, the processor 16 can be optionally integrated with the image sensor 14 as a single chip, which depends on design demand.

The body 12 can include a top portion 28 and a support portion 30 connected with each other. The support portion 30 is set on the circuit board 26 to surround the image sensor 14, the processor 16 and the light source 18. The top portion 28 covers upon the support portion 30 so that the top portion 28 and the support portion 30 can be used to prevent the image sensor 14 from interference of environmental light, and can be touched by the user (for example: the body 12 may be pushed and pulled via the opaque cover 20); therefore, the top portion 28 can be shifted, lowered, pinched and rotated by deformation of the support portion 30, so that hardness of the top portion 28 is preferably greater than hardness of the support portion 30, and the support portion 30 is preferably made by resilient material. As shown in FIG. 2, the body 12 can have an inner space to form a hollow sunken structure, and the deformable bottom surface 22 is located on an inner of the top portion 28 of the hollow sunken structure. The pattern 24 is shifted, lowered, deformed and/or rotated in accordance with a movement of the body 12, and the processor 16 can analyze variation of the pattern 24 within the frames captured at different points in time to generate the displayed object control signal.

Figure 3A:
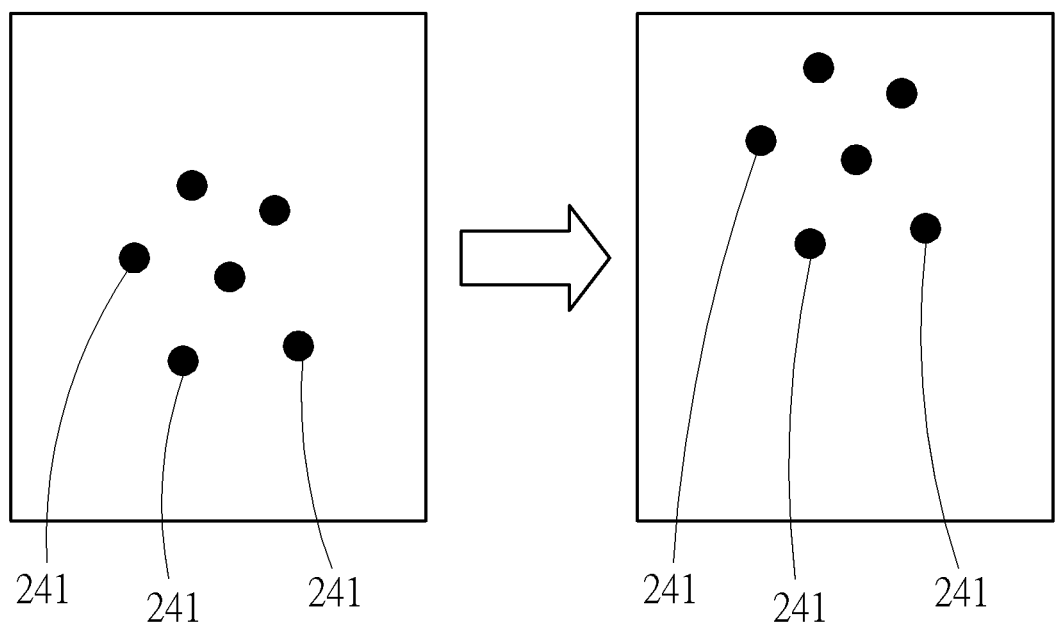
FIG. 3A, FIG. 3B, FIG. 3C and FIG. 3D respectively are diagrams of frames containing the dots varied by different gestures according to the first embodiment of the present invention.
Figure 3B:
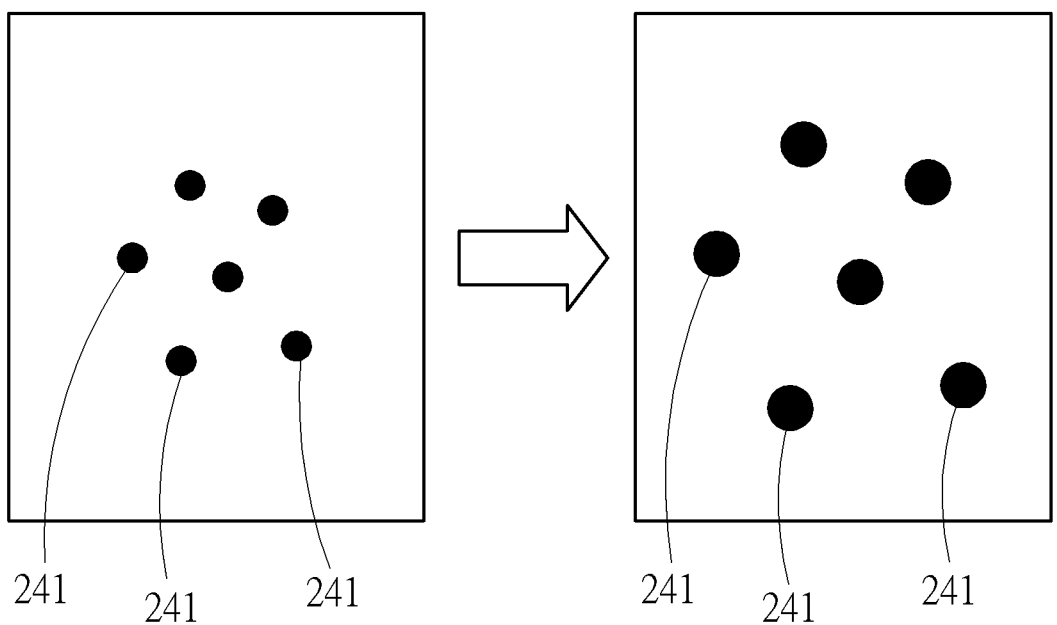
Figure 3C:
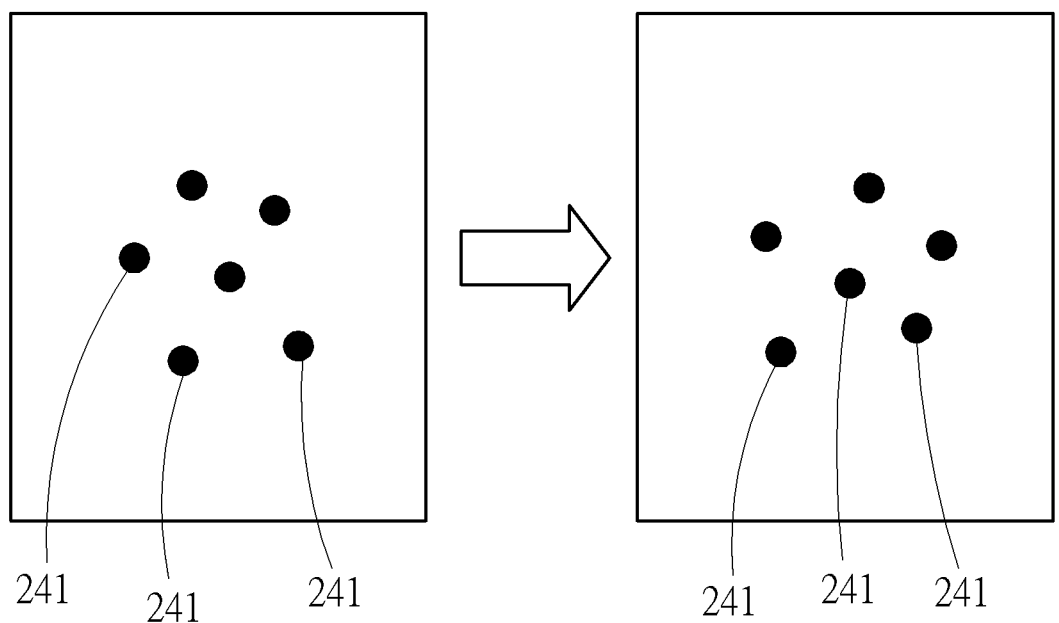
Figure 3D:
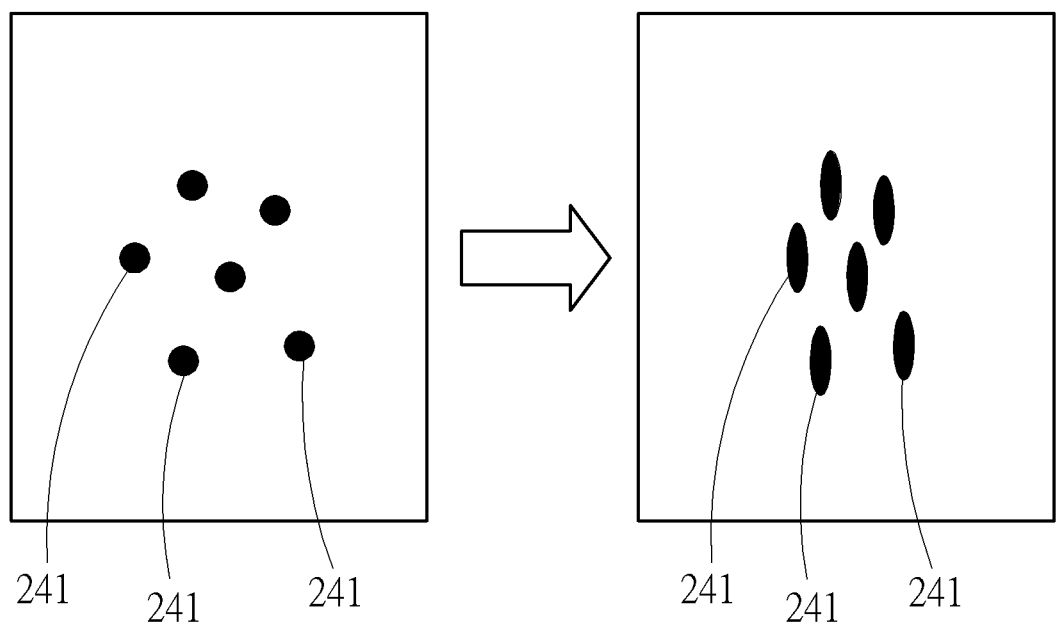

In the first embodiment, the pattern 24 can include a plurality of dots 241 forming the pattern 24, the plurality of dots 241 can be arranged in asymmetry and made by high-reflective material, and variation of the dots 241 is utilized to analyze gesture of the user applied for the joystick 10. Please refer to FIG. 3A to FIG. 3D. FIG. 3A, FIG. 3B, FIG. 3C and FIG. 3D respectively are diagrams of frames containing the dots 241 varied by different gestures according to the first embodiment of the present invention. As shown in FIG. 3A, the dots 241 are shifted at a specific direction, which means the joystick 10 is pushed or pulled toward the specific direction accordingly. As shown in FIG. 3B, dimensions of the dots 241 are enlarged, which means the joystick 10 is pressed and lowered relative to the circuit board 26; accordingly, the joystick 10 may be determined as being lifted while the dots 241 are reduced. As shown in FIG. 3C, the dots 241 are twisted to represent rotation of the joystick 10; and as shown in FIG. 3D, the dots 241 are narrowed and widened to represent that the joystick 10 can be pinched.

Figure 4:
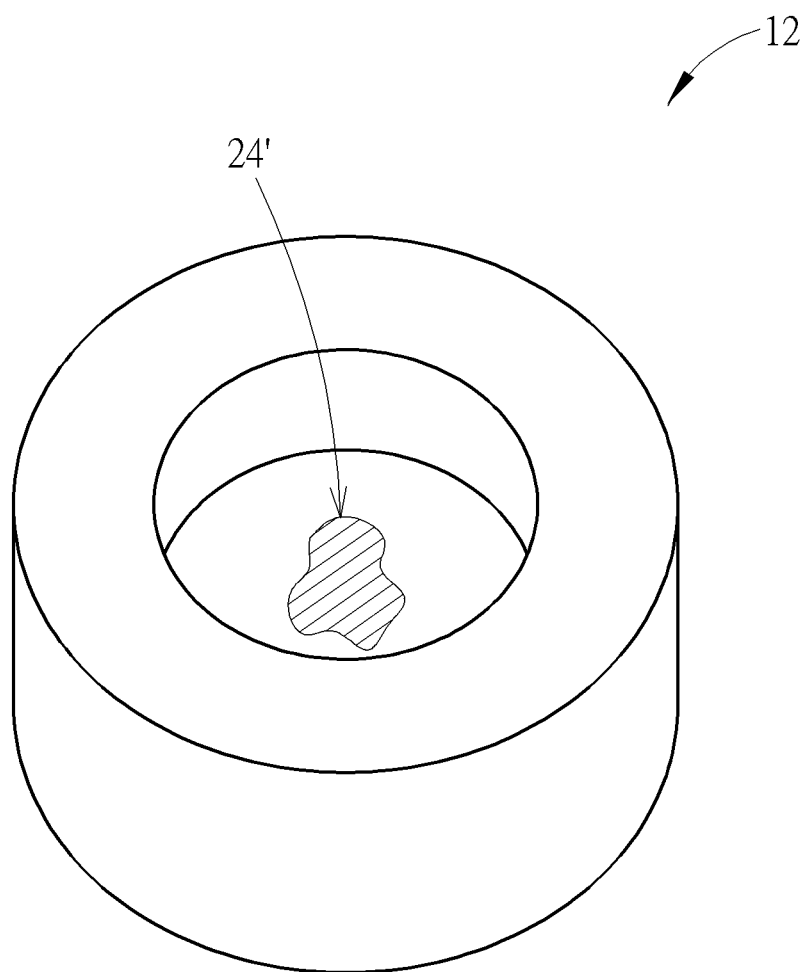
FIG. 4 is a diagram of the body in the bottom view according to a second embodiment of the present invention.

Please refer to FIG. 1 and FIG. 4. FIG. 4 is a diagram of the body 12 in the bottom view according to a second embodiment of the present invention. The body 12 of the joystick 10 can have a pattern 24' designed as an asymmetric form, rather than the plurality of dots. The pattern 24' can be the high-reflective material coated on the top portion 28 of the body 12. The pattern 24' can be shifted, scaled, rotated and/or deformed while the body 12 is handled by the user, such like the first embodiment shown in FIG. 3A to FIG. 3D, an outside contour of the dots can be viewed as the pattern 24', and the outside contour must be asymmetric to accurately identify reversed motion of the body 12. The image sensor 14 captures one or some frames containing variation of the pattern 24', and the processor 16 analyzes the frames to generate the displayed object control signal in accordance with the user's gesture.

Figure 5:
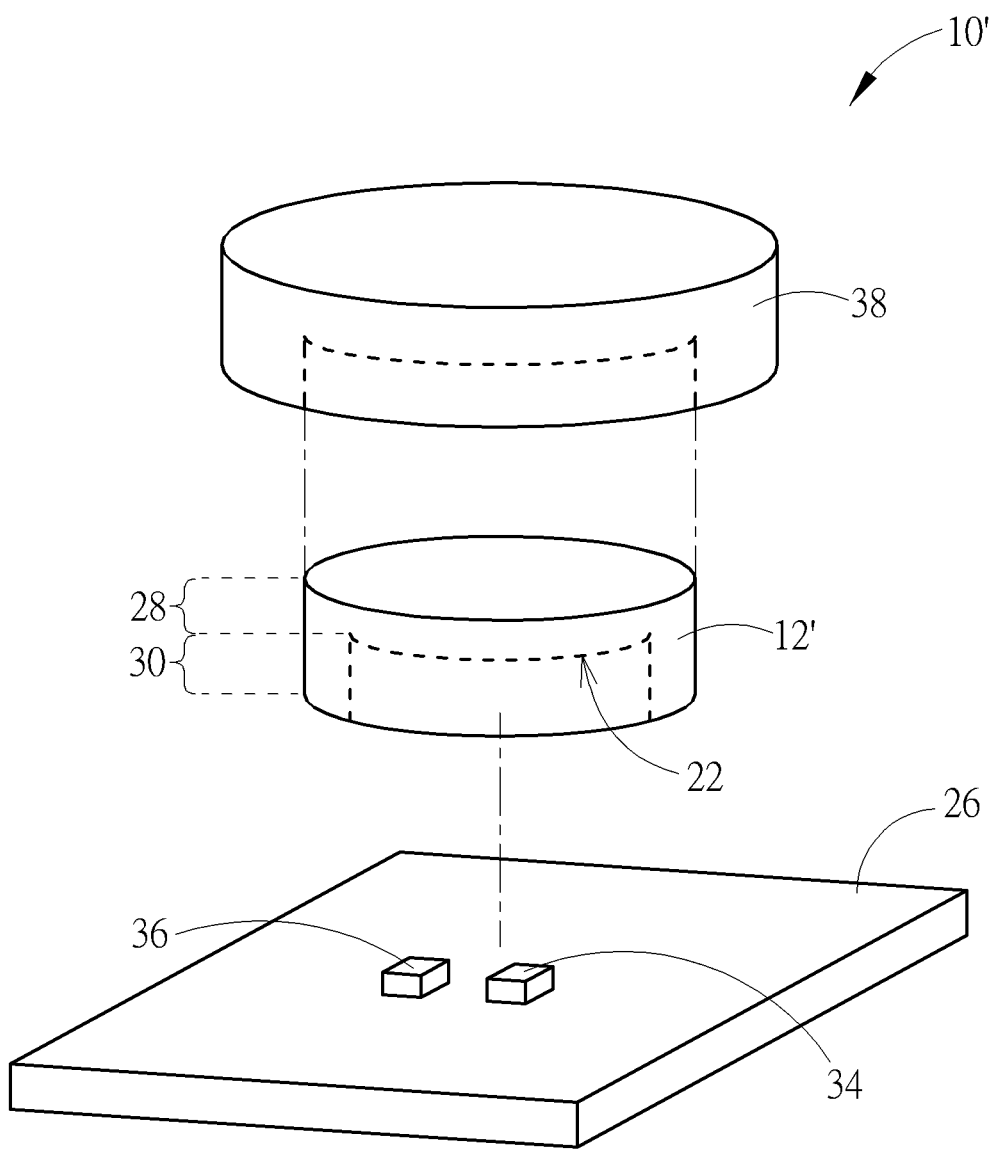
FIG. 5 is a diagram of the joystick according to a third embodiment of the present invention.
Figure 6:
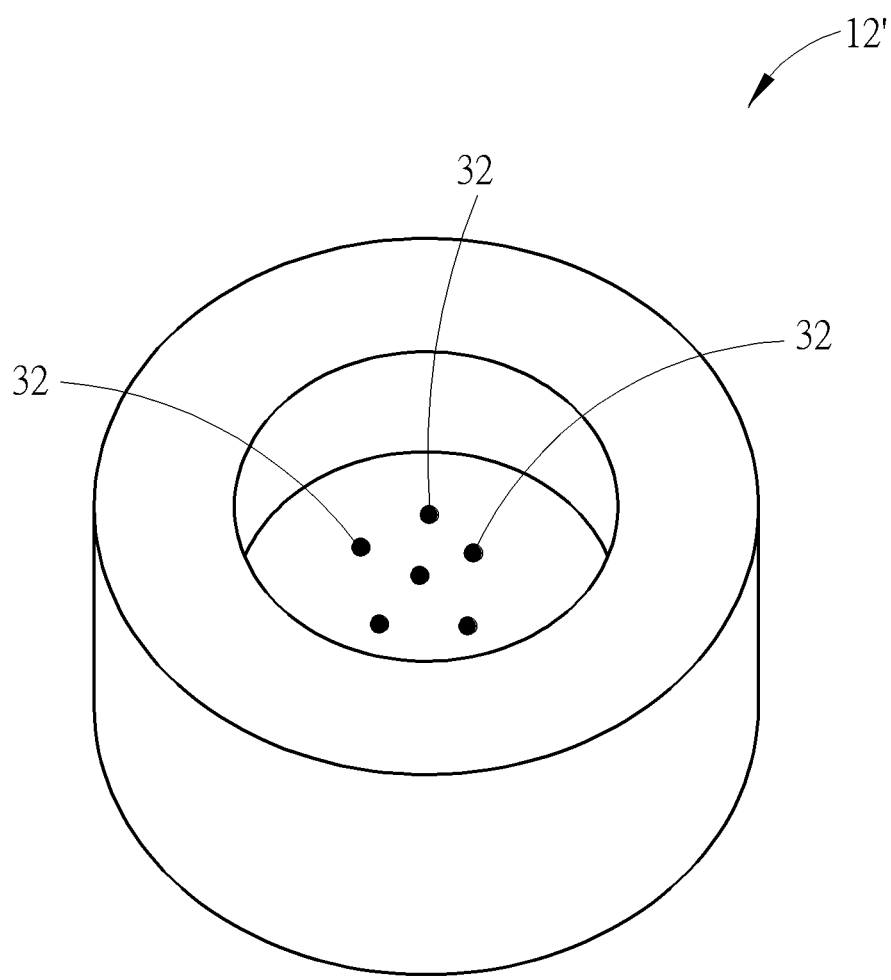
FIG. 6 is a diagram of the body of the joystick in the bottom view according to the third embodiment of the present invention.

Please refer to FIG. 5 and FIG. 6. FIG. 5 is a diagram of the joystick 10' according to a third embodiment of the present invention. FIG. 6 is a diagram of the body 12' of the joystick 10' in the bottom view according to the third embodiment of the present invention. In the third embodiment, elements having the same numeral as ones of the foresaid embodiments have the same structures and functions, and a detailed description is omitted herein for simplicity. The body 12' has the deformable bottom surface 22 whereon a plurality of conducting dots 32 is disposed. The body 12' can be the hollow sunken structure mainly composed of the top portion 28 and the support portion 30. The joystick 10' includes a capacitive sensor 34 and a processor 36 disposed under the body 12' and electrically connected each other, and further includes a cover 38 disposed above the body 12' for shelter and being the handle. Optical detection technology is not used in the joystick 10', so the cover 38 can be made by transparent material or opaque material.

In the third embodiment, the plurality of conducting dots 32 is arranged in asymmetry and electrified by an external power supply (not shown in the figures). While the joystick 10' is handled by the user to input the gesture, the body 12' is moved and/or deformed, an inductive capacitance value of each conducting dot 32 may be varied accordingly, the capacitive sensor 34 can acquire one or some frames after detection of the plurality of conducting dots 32, and each pixel of the frame can be represented as the inductive capacitance value of the related conducting dot 32; the conducting dot 32 may be optionally electrified and detection efficiency of the capacitive sensor 34 can increased adaptively for preferred performance. Thus, the processor 36 can analyze one or some frames to get variation of the inductive capacitance value about the plurality of conducting dots 32, so as to generate the displayed object control signal in accordance with the user's gesture.

Figure 7:
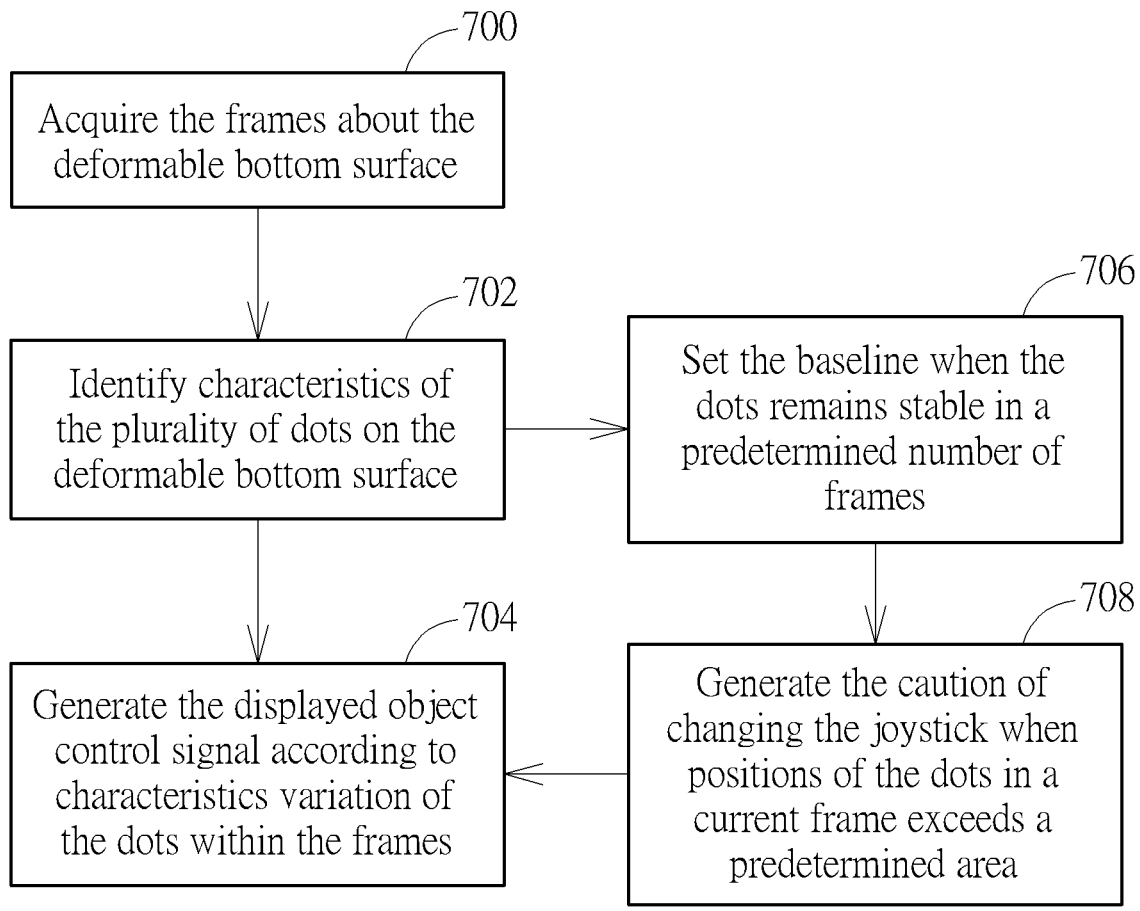
FIG. 7 is a flow chart of a control method for providing displayed object control function according to the embodiment of the present invention.

Please refer to FIG. 7. FIG. 7 is a flow chart of a control method for providing displayed object control function via the optical detection or capacitance detection technique according to the embodiment of the present invention. The following statement is an example of the first embodiment, and certainly the control method illustrated in FIG. 7 can be suitable for the joystick 10 and 10' shown in FIGS. 1-6. First, step 700 is executed to acquire one or some frames about the deformable bottom surface 22 by the image sensor 14 (or the capacitive sensor 34 is driven to capture the frame containing the conducting dots 32). While the joystick 10 is handled, characteristic of the dots 241 are varied to behave change of the pattern 24 and the deformable bottom surface 22. The said characteristic can be a value of the related pixel within the frame, and steps 702 and 704 are executed to identify the characteristic of the dots 241 for ascertaining operation of the joystick 10, and to generate the displayed object control signal according to the characteristics of the dots 241.

During operation of the joystick 10, the frames is captured continuously, and the characteristics may represent a variation of difference between different frames or represent positions of images of the plurality of dots 241 in one frame. The processor 16 can compare the characteristics between adjacent frames; for example, the processor 16 compares the characteristics of the dots 241 between the frame and a previous frame or between the frame and a next frame, so as to immediately compute the displayed object control signal. Further, the processor 16 may compare the characteristics between the frame and a preset frame, and the preset frame is defined as a captured image about the deformable bottom surface 22 in the beginning, so the difference between the frame and the preset frame is computed to avoid invalid detection because of mechanical fatigue.

In addition, the control method can provide warning function to remind the user of replacing the damaged joystick 10. As shown in FIG. 7, steps 706 and 708 are optionally executed to set a baseline when the plurality of dots 241 remains stable in a predetermined number of frames, and to generate a caution of changing the joystick 10 when positions of the plurality of dots 241 in the current frame exceeds a predetermined area. The said baseline is a threshold utilized to check whether the joystick 10 is resiliently fatigued. The baseline can be a curve or a contour, and is defined in the beginning of the control method (before the mechanical fatigue is generated). Position of the plurality of dots 241 should be located inside the predetermined area formed by the baseline, the dots 241 exceeding the predetermined area means the mechanical fatigue being generated, so that the control method outputs the caution to remind replacement of the joystick 10.

The present invention disposes the pattern on the deformable bottom surface of the body, the pattern can be an asymmetric graffito, the plurality of colored dots or conducting dots, characteristics of the pattern can be varied in accordance with motion of the joystick, so that the characteristic variation can be transformed into the gesture applied to the joystick. The joystick and the related control method in the present invention have no drawback of the mechanical fatigue, and the joystick can read various gestures for preferred user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pressure detection device of detecting a forced state of a deformable object, comprising:
   a body being a case of a deformable hollow structure, the body comprising a top portion and a support portion, the support portion being surrounded and connected with the top portion to form a columnar structure, hardness of the top portion being greater than hardness of the support portion, an inner surface and an outer planar surface being two opposite surfaces of the top portion, the outer planar surface being pressed by an external force, and an identifiable vision feature being a plurality of dots disposed on the same inner surface;
   an image sensor disposed inside the body and facing the inner surface of the body, and adapted to capture a frame containing the identifiable vision feature on the inner surface;
   a light source disposed under the body and on the same surface adjacent to the image sensor for facing the inner surface of the body, and adapted to project a beam onto the inner surface; and
   a processor electrically connected with the image sensor, and adapted to analyze position variation of the identifiable vision feature within the captured frame for identifying a gesture applied to the outer planar surface of the body is laterally shifting or obliquely pressing.

2. The pressure detection device of claim 1, wherein the motion type is a group consisted of kneading and pressing toward at least one specific direction.

3. The pressure detection device of claim 1, wherein the identifiable vision feature is the plurality of dots arranged in symmetry or in asymmetry.

4. The pressure detection device of claim 3, wherein the plurality of dots has a reflectivity greater than a reflectivity of the inner surface.

5. The pressure detection device of claim 1, wherein the identifiable vision feature is disposed on at least one of a bottom and a lateral of the inner surface.

6. The pressure detection device of claim 1, wherein the processor is adapted to further analyze deformation variation of the identifiable vision feature within the captured frame for identifying the motion type of the gesture.

7. The pressure detection device of claim 1, wherein the top portion is formed by deformable material, or the top portion and the support portion are formed by the deformable material.

* * * * *